J. CLOSS.
Churn.
No. 24,197.
Patented May 31, 1859.
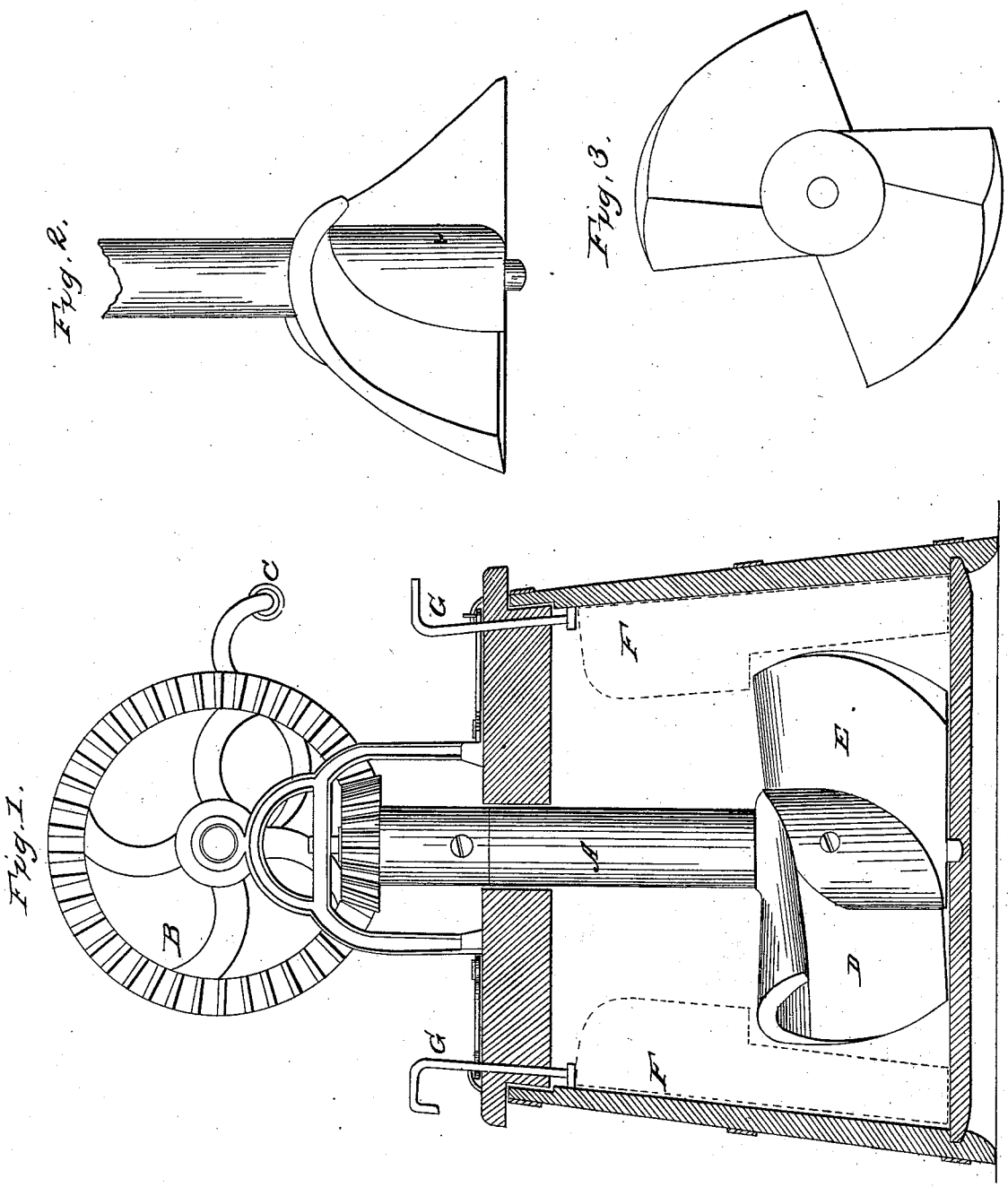

UNITED STATES PATENT OFFICE.

JACOB CLOSS, OF DECATUR, INDIANA.

CHURN.

Specification of Letters Patent No. 24,197, dated May 31, 1859.

*To all whom it may concern:*

Be it known that I, JACOB CLOSS, of the county of Adams, in the State of Indiana, have invented a new and Improved Churn for Churning Butter; and I declare the following to be a description thereof, full and exact, reference being had to the accompanying drawings and to the letters of reference marked thereon.

The nature of my invention consists in constructing a tub churn having the dashers on a vertical shaft to operate upon the principle of a propeller screw.

My invention is made as follows. I take an ordinary tub of about twelve (12) inches in diameter by eighteen (18) inches in height of the shape of an inverted cone with a nicely fitted lid, as shown in Figure 1. The lid is in halves. Through the center of the lid from the bottom of the churn extends a vertical shaft as shown by letter "A," Fig. No. 1, upon the top of which is a small cog wheel that meshes with the large wheel "B" driven by the crank C. This top will be understood by Fig. 1. Upon the bottom of the shaft "B" is the dasher "D E" constructed to some extent in the shape of a propeller screw with the top dipping over as shown in Fig. No. 2. These dashes or paddles are made of a single piece of wood of from 4 to 6 inches square, with length less than diameter of the churn. A hole is bored through the center of sufficient capacity to permit the vertical shaft to pass through to the bottom of the churn to the point of its axis. Then saw in on either side of the shaft on the corners above and below and block out leaving sufficient bulk of timber to permit the paddles to be shaped in form as in Fig. No. 3.

"F" "F" in Fig. No. 1 are vertical breakers that are so adjusted by wires on the top as at "S" "S" to make them stand out as shown by the dotted lines in Fig. 1, while churning, and while gathering the butter they are made to lay in against the side of the churn as shown by the straight line on the inside of churn as in Fig. No. 1.

What I claim and desire to secure by Letters Patent is—

The use of the screw dashers D E, constructed and operated as set forth in connection with the wings F F as specified.

JACOB CLOSS. [L. S.]

Witnesses:
    DAVID STUDEBAKER,
    ISAAC PYLE.